(12) United States Patent
Suh

(10) Patent No.: US 7,423,236 B2
(45) Date of Patent: Sep. 9, 2008

(54) METHOD AND SYSTEM FOR REAL-TIME MONITORING AND CONTROLLING HEIGHT OF DEPOSIT BY USING IMAGE PHOTOGRAPHING AND IMAGE PROCESSING TECHNOLOGY IN LASER CLADDING AND LASER-AIDED DIRECT METAL MANUFACTURING PROCESS

(75) Inventor: Jeong-Hun Suh, Taejon (KR)

(73) Assignee: Insstek Inc, Taejon (KR)

( * ) Notice: Subject to any disclaimer, the term of this patent is extended or adjusted under 35 U.S.C. 154(b) by 95 days.

(21) Appl. No.: 10/495,185

(22) PCT Filed: Nov. 17, 2001

(86) PCT No.: PCT/KR01/01970

§ 371 (c)(1), (2), (4) Date: May 11, 2004

(87) PCT Pub. No.: WO03/042895

PCT Pub. Date: May 22, 2003

(65) Prior Publication Data

US 2004/0251242 A1     Dec. 16, 2004

(51) Int. Cl.
*B23K 26/00*     (2006.01)

(52) U.S. Cl. .............. 219/121.64; 219/121.83; 219/121.85

(58) Field of Classification Search ............ 219/121.64, 219/121.61, 121.63, 121.82, 121.83, 121.85, 219/121.6
See application file for complete search history.

(56) References Cited

U.S. PATENT DOCUMENTS

| | | | |
|---|---|---|---|
| 4,764,655 A * | 8/1988 | Ortiz et al. ............. | 219/121.83 |
| 5,517,420 A * | 5/1996 | Kinsman et al. ............. | 700/166 |
| 5,659,479 A * | 8/1997 | Duley et al. .................. | 700/166 |
| 5,715,270 A | 2/1998 | Zediker et al. | |
| 5,895,581 A | 4/1999 | Grunwald | |
| 6,122,564 A * | 9/2000 | Koch et al. ................... | 700/123 |
| 6,144,008 A | 11/2000 | Rabinovich | |
| 6,518,541 B1 * | 2/2003 | Kelly ..................... | 219/121.62 |
| 6,925,346 B1 * | 8/2005 | Mazumder et al. .......... | 700/119 |
| 6,940,037 B1 * | 9/2005 | Kovacevic et al. ..... | 219/121.64 |
| 7,043,330 B2 * | 5/2006 | Toyserkani et al. ......... | 700/166 |

FOREIGN PATENT DOCUMENTS

| | | |
|---|---|---|
| JP | 06-126475 | 10/1994 |
| WO | WO 00/00921 | 1/2000 |

\* cited by examiner

*Primary Examiner*—M. Alexandra Elve
(74) *Attorney, Agent, or Firm*—Drinker Biddle & Reath LLP

(57) ABSTRACT

The object of this invention is to provide a method and system for real-time monitoring and controlling the height of a deposit by using image photographing and image processing technology in a laser cladding and laser-aided direct metal manufacturing process. This invention also provides a method of controlling the intensity of laser power, which is one of the most important process variables, regardless of the operational condition of a laser power unit (401). The method and system of this invention controls the height of a deposit (205) by real-time monitoring the position and the height of a melt pool (203) and controlling the process variables using the image photographing and image processing technology in such a laser cladding and laser-aided direct metal manufacturing process based on a laser surface modification technology, such as laser surface alloying and laser cladding, or a laser-aided direct metal manufacturing technology.

9 Claims, 11 Drawing Sheets

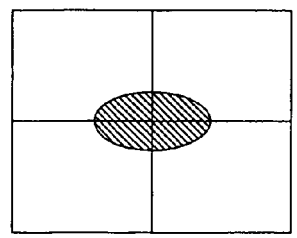
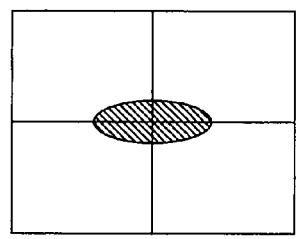
FIG. 9A    FIG. 9B
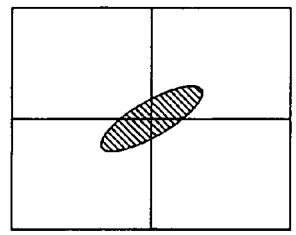
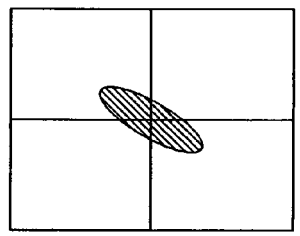
FIG. 9C    FIG. 9D
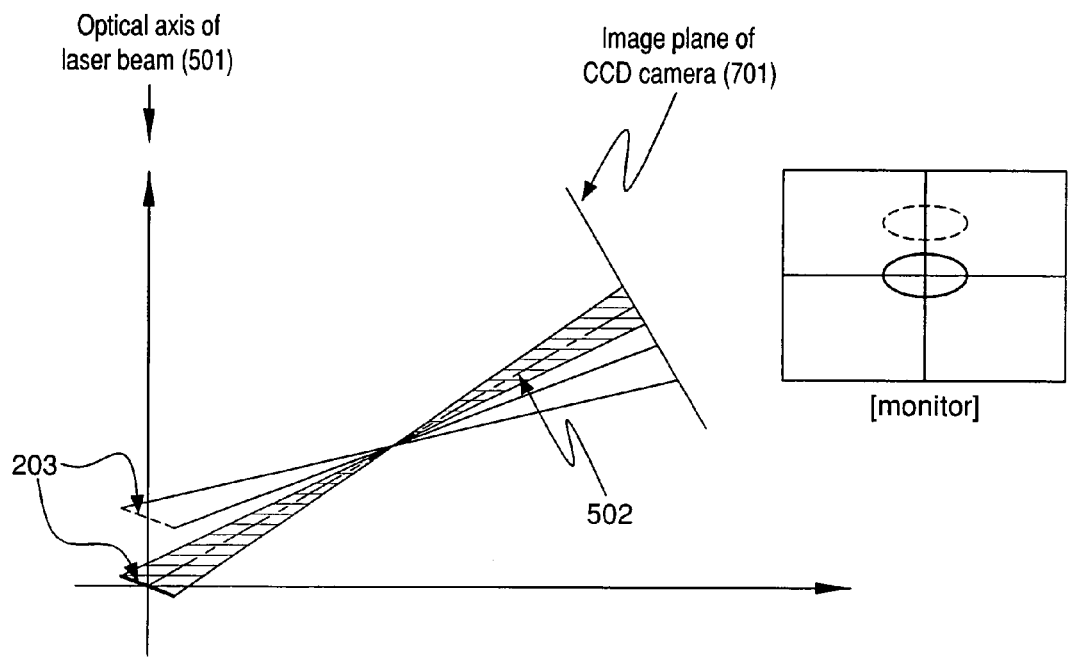
FIG. 10

METHOD AND SYSTEM FOR REAL-TIME MONITORING AND CONTROLLING HEIGHT OF DEPOSIT BY USING IMAGE PHOTOGRAPHING AND IMAGE PROCESSING TECHNOLOGY IN LASER CLADDING AND LASER-AIDED DIRECT METAL MANUFACTURING PROCESS

TECHNICAL FIELD

The present invention relates to a method of real-time monitoring and controlling the height of a cladding layer using image photographing and image processing technology in laser cladding and direct metal manufacturing.

BACKGROUND ART

Laser-aided direct metal manufacturing is defined as rapid near-net shaping that can rapidly manufacture 3D products and tools necessary for the manufacture of the products with functional materials (for example, metal, alloy, ceramic or the like) on the basis of the digital data of 3D subjects stored in computers, and falls under "direct metal tooling".

The digital data of 3D subjects includes 3D Computer Aided Design (CAD) data, medical Computer Tomography (CT) and Magnetic Resonance Imaging (MRI) data, and digital data measured by 3D object digitizing systems, and the tools denote trial and mass-production molds and dies necessary for the manufacture of products.

Those techniques allow functional metal prototypes, trial and mass-production molds, finished products of complicate shape and various tools to be rapidly manufactured in comparison with conventional manufacturing techniques such as Computerized Numerical Control (CNC) cutting, casting, and other manufacturing machinery, etc. Those techniques are applicable to the restoration, remodeling and repairing of molds and dies using reverse engineering technology.

The underlying concept of those techniques, in which physical shapes can be generated from CAD data, is similar to that of general printers. The direct metal manufacturing allows 3D physical shapes to be generated by forming functional material in 3D space at the precise positions, much as printers print documents by applying carbon or ink on the 2D surface of paper at precise positions using document data files stored in computers.

Since it is difficult to generate 3D shapes from CAD data through conventional manufacturing processes in which a material is cut or a molten material is poured into and solidified in a mold, Materials Incress Manufacturing (MIM) has to be employed.

Basically, a 3D object is comprised of 2D surfaces, and each of the 2D surfaces is comprised of 1D lines. Accordingly, a 3D shape can be manufactured by stacking 2D surfaces one on top of another. This technique is called MIM process. As shown in FIG. 1, the 3D shape is manufactured through additive materials deposition for building shapes, differently from the conventional manufacturing processes in which a bulk material is cut or a molten metal is poured to a mold and solidified in the mold.

In the laser-aided direct metal manufacturing technology, the 2D surfaces are physically formed through laser cladding.

As shown in FIG. 2, the laser cladding is a technology of forming a cladding layer 205 on the surface of a specimen in such a way that a local molten pool 203 is formed by irradiating a laser beam 202 on the surface 201 of a specimen and, at the same time, a cladding material (for example, metal, alloy, ceramic or the like) in the form of powder is fed to the molten pool 203 from the outside. Referring to FIG. 3, in the laser-aided direct metal manufacturing, 3D functional metallic products or tools can be rapidly shaped in such a way that 2D sectional information is calculated from 3D CAD data and cladding layers each having shape, thickness and/or height corresponding to the 2D sectional information are sequentially formed.

The 2D sectional information used in the process of shaping is made by slicing 3D CAD data into data of a uniform thickness and/or a uniform height or into 2D data of a variable thickness, which is utilized as shaping information. In order to physically materialize a precise 3D shape corresponding to CAD data by using the sectional data, a cladding layer of precise shape, height and/or thickness corresponding to the 2D sectional information can be formed through the laser cladding process.

The above process considerably affects the dimensional precision of a 3D product. In particular, a technology of controlling the height of a cladding layer is a key technology in implementation of the laser-aided direct metal manufacturing technology.

In the laser-aided direct metal manufacturing technology, as in the laser cladding technology shown in FIG. 2, a cladding layer is formed by interpolation-transferring a metallic substrate (hereinafter, referred to as "a specimen") around a fixed laser beam along x and y-axes or a laser beam around a fixed specimen. Alternatively, the laser beam can be transferred together with the specimen, and a three or more-axis transfer system or robot can be utilized to increase the degree of freedom of manufacturing.

In the process of shaping, the shape of the cladding layer corresponding to the 2D sectional information mainly depends on a tool path calculated from the sectional information and the precision of a transfer system, and can be relatively easily materialized. However, the height of the laser cladding layer is affected by a large number of process parameters, such as a laser power, the mode and size of a laser beam, the traverse speed of a specimen, the characteristics of cladding powder, powder feeding rate, the falling speed of powder, the overlapping factor of cladding beads, the kinds or amounts of various auxiliary gases supplied, etc. Additionally, environmental factors, such as the variation of temperature on the surface of a specimen caused by heat accumulation, the conditions of the surface of a specimen and a laser generator, can affect the height of the cladding layer formed.

Accordingly, in order to obtain the height of the cladding layer corresponding to 2D sectional information, there is technical difficulty that process parameters affecting the height of the cladding layer should be controlled while the position of a molten pool is monitored in real time.

U.S. Pat. No. 6,122,564 discloses a feedback apparatus and method that is comprised of an optical detection device using a phototransistor and an electron circuit for the purpose of controlling the height of a cladding layer. In this method, the optical detection device is positioned near a molten pool formed on the surface of a specimen by the irradiation of a laser beam and the optical axis of the optical detection device is arranged toward a target height so as to detect light (light of an infrared wavelength) irradiated from the molten pool when the molten pool reaches the target height. The optical detection device is comprised of a narrow band-pass filter, a camera lens, a phototransistor or photoelectron sensor. In order to allow light (infrared light) to be detected by the phototransistor only when the molten pool reaches a height at which the molten pool meets the optical axis, a mask having an aperture whose center passes through the optical axis is positioned in front of the phototransistor.

As a result, when the molten pool reaches a target height (the height of a cladding layer reaches the target value), part of light having only an infrared light wavelength passes through the narrow band-pass filter and can pass through the aperture of the mask, so the phototransistor can detect the light. However, when the molten pool does not reach the target height, light irradiated from the molten pool is blocked by the mask, so the phototransistor cannot detect any light.

In this method, it is determined whether the height of a cladding layer (a molten pool) reaches a target value through the light detection of the phototransistor. The phototransistor experiences a voltage drop phenomenon when being exposed to light. In this case, an electric circuit is constructed such that an analog voltage signal transmitted to a laser generator is controlled using an electric signal generated, and a laser power is controlled by allowing laser beam to be On or Off according to the detection of light by the phototransistor.

However, in U.S. Pat. No. 6,122,564, the optical detection device determines the same if the height of the molten pool is greater or less than a target value of the cladding layer. At this time, there occurs a problem that a normal laser power is generated. In particular, when at a certain position the height of the cladding layer is partially greater than the target value, the optical detection device determines that the height of the cladding layer does not reach the target value, and generates a normal laser power.

Accordingly, the cladding layer at this position is coated to be rather thicker or higher and the repeated performance of the laser cladding at this position causes the problem to be worse, thus deteriorating the precision of shaping. Additionally, in the laser-aided direct metal manufacturing, when a 3D shape is formed using 2D sectional information of a uniform thickness and/or height, there occurs no problem with the mechanical structure of the optical detection device. However, when the 3D shape is formed using 2D sectional information of a variable thickness and/or height, there occurs a problem that the optical detection device should be arranged and corrected whenever the height of the cladding layer is varied.

In addition, a laser power control method is a laser beam On/Off method in which the duration time of a laser pulse is controlled, so it is difficult to apply the technology to a continuous wave laser generator.

DISCLOSURE OF THE INVENTION

Accordingly, the present invention has been made keeping in mind the above problems occurring in the prior art, and an object of the present invention is to provide a method and apparatus that, in laser cladding and laser-aided direct metal manufacturing, is capable of measuring the position and height of a molten pool in real time using high-speed image photographing and image processing, and desirably controlling the height of a cladding layer by controlling process parameters.

Another object of the present invention is to provide a laser power calibration method, which is capable of obtaining a laser power, which is the most important process parameter, regardless of the state of a laser.

Another object of the present invention is to provide a method and apparatus, in which the actual position and height of a molten pool are measured in real time, so that a process parameter can be controlled to allow the height of a cladding layer to precisely coincide with the target value of the cladding layer, a shaping operation can be performed without rearranging or correcting an image monitoring device when a 3D shape is formed using 2D sectional information including a variable thickness, the method and apparatus of the present invention can be applied to pulse and continuous wave lasers, and the image of an actual cladding process can be observed through a monitor in the process of shaping.

Still another object of the present invention is to provide a method and apparatus, which is advantageous in that the method and apparatus can be applied to laser surface modification, such as laser surface alloying and laser cladding, and laser multi-layer cladding in which a cladding layer of 2 mm or more is formed through repeated laser cladding, as well as laser-aided direct metal manufacturing.

In order to accomplish the above object, the present invention provides a method for monitoring and controlling a height of a cladding layer in laser cladding and laser-aided direct metal manufacturing, comprising the steps of monitoring and measuring a position and a height of a molten pool in real time using image photographing and image processing and controlling process parameters in real time.

In addition, the present invention provides an apparatus for monitoring and controlling a height of a cladding layer in real time using image photographing and image processing in laser cladding and laser-aided direct metal manufacturing comprising: a laser generator for forming a molten pool on a surface of a specimen by irradiation of a laser beam; a beam transmitting apparatus for transmitting the laser beam generated by the laser beam generator; a beam condensing apparatus for condensing the beam transmitted through the beam transmitting apparatus; a cladding material feeder for feeding cladding materials to the molten pool formed on the surface of the specimen by the irradiation of the laser beam condensed by the beam condensing apparatus; a transfer system for keeping a focal distance of the laser beam constant in the process of cladding with the beam condensing apparatus positioned in a z-axis direction, and freely transferring a specimen along a tool path around the laser beam to allow the laser cladding to be performed with the specimen fixed on an x and y-axes table; a CAD/CAM apparatus for generating shaping information such as the tool path on the basis of 3D CAD data and transmitting the shaping information; an image photographing apparatus for obtaining an image of the molten pool in real time and transmitting the image of the molten pool; an image processing apparatus for receiving the image of the molten pool, calculating a position and a height of the molten pool on the basis of the image of the molten pool, and transmitting the calculated values; and a control system for controlling and monitoring the elements, receiving the shaping information from the CAD/CAM apparatus and performing the laser cladding, and receiving information about the molten pool and controlling a process parameter in real time to allow the position and height of the cladding layer to reach target values.

BRIEF DESCRIPTION OF THE DRAWINGS

The above and other objects, features and other advantages of the present invention will be more clearly understood from the following detailed description taken in conjunction with the accompanying drawings, in which:

FIGS. 7, 7(A) and 7(B) are diagrams showing a second principle by which an image of a molten pool is observed by the image photographing apparatus, FIG. 7(A) being a schematic view of the molten pool observed in the optical axis of a laser beam, FIG. 7(B) being a view of the molten pool observed in a monitor;

FIGS. 9(A) to (D) are views showing variations in the image of the molten pool according to the transfer direction of a specimen or laser beam, FIG. 9(A) being a view taken when the molten pool is directed toward the image photographing apparatus, FIG. 9(B) is a view taken when the molten pool is oppositely directed toward the image photographing apparatus, FIGS. 9(C) and (D) being views taken when the specimen or laser beam are transferred in a direction perpendicular to the optical axis of the image photographing apparatus;

FIG. 10 is a schematic diagram showing how the images of the molten pool are monitored according to variations in the height of the molten pool;

BEST MODE FOR CARRYING OUT THE INVENTION

Hereinafter, a method of real-time monitoring and controlling the height of a cladding layer using image photographing and image processing in laser cladding and direct metal manufacturing in accordance with an embodiment of the present invention is described in detail.

Figure 4:
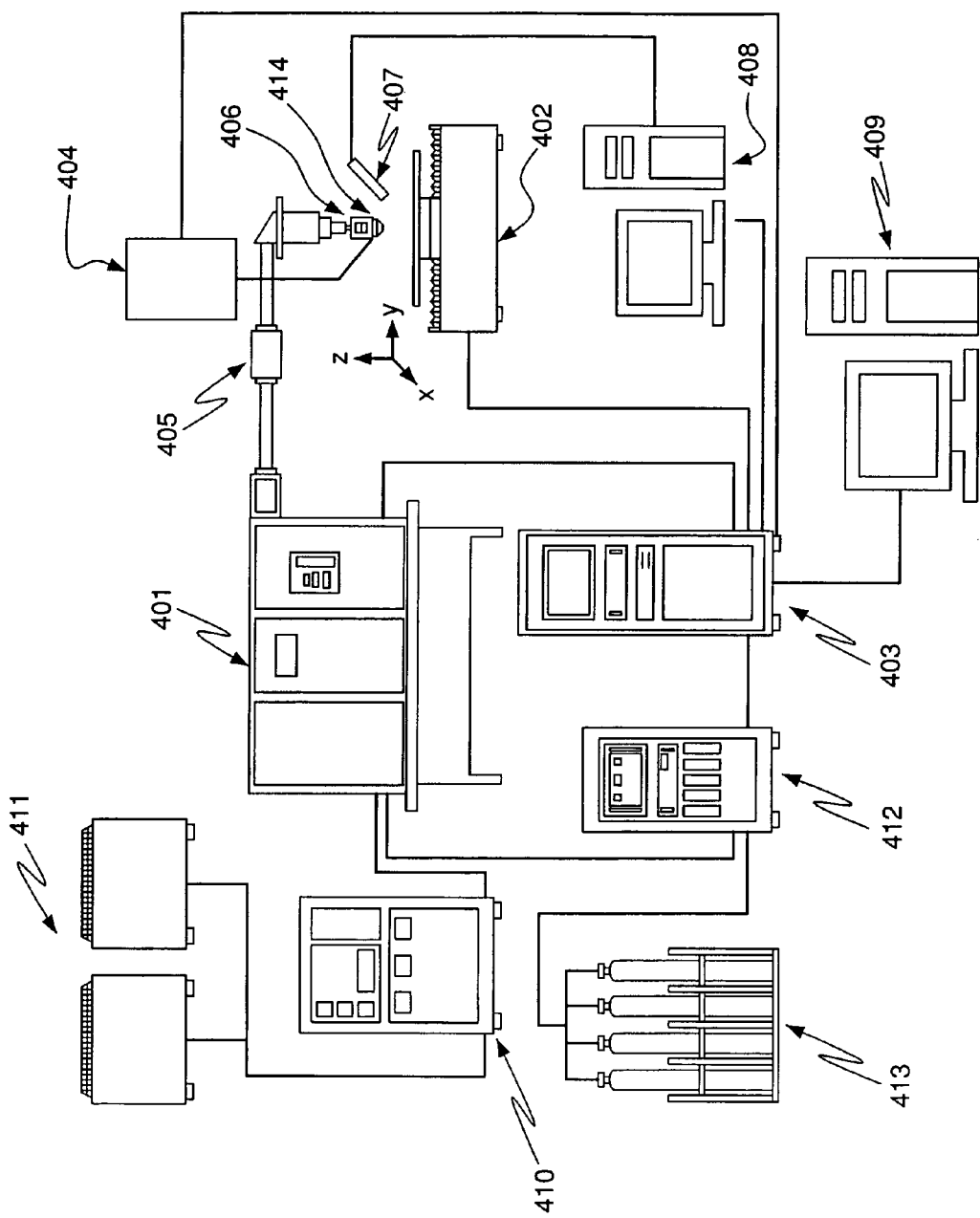
FIG. 4 is a schematic view of a laser-aided direct metal manufacturing system.

FIG. 4 is a schematic view showing a laser-aided direct metal manufacturing system. The laser-aided direct metal manufacturing system of the present invention includes image photographing and processing apparatuses 407 and 408 for controlling the height of a cladding layer in real time, and a Computer-Aided Design (CAD)/Computer-Aided Manufacturing (CAM) 409 for calculating 2D section information from 3D CAD data, calculating a tool path corresponding to the 2D section information and transmitting the tool path to a control system 403.

A laser generator 401 is preferably an industrial $CO_2$ laser, but may be any laser of any wavelength that can make a molten pool on the surface of a metal specimen through the irradiation of laser beams, like a Nd—YAG or high power diode laser. The laser beam generated by the laser generator is transmitted through a beam transmission apparatus 405 to a beam condensing apparatus 406. When the Nd—YAG laser or the like is employed; a laser beam can be transmitted through an optical fiber.

The beam condensing apparatus 406 is made by combining optical parts such as lenses, mirrors or the like, and functions to condense a laser beam to fit the laser cladding. A concentric powder-feeding nozzle 414 is situated under the beam condensing apparatus 406 to feed powder fed from a cladding material feeder 404, preferably a powder-feeding system, to a molten pool.

Meanwhile, the cladding material is preferably in the form of powder, but may also be in the form of a rod or ribbon. When the cladding material in the form of powder is used, concentric powder-feeding and lateral powder-feeding nozzles are used and distinguished according to the directions of supply of powder on the basis of the laser beam.

The concentric powder-feeding does not restrict a tool path because it allows metallic powder to be uniformly fed to a molten pool in all directions, and is suitable for laser-aided direct metal manufacturing.

On the other hand, the lateral powder-feeding allows metallic powder to be fed to a molten pool in the direction of one side of a laser beam. The lateral powder-feeding can reduce the ratio of powder loss to the maximum of 5%, and is suitable to form a relatively thick cladding bead of more than 1 mm in thickness. However, the lateral-powder-feeding restricts a tool path used in a shaping operation due to an anisotropy in which the shape and height of a bead are varied in a cladding direction (the transfer direction of a specimen or laser beam).

Meanwhile, the transfer system (work table) 402 keeps a focal distance of the laser beam constant in the process of cladding with the beam condensing apparatus 406 positioned in a z-axis direction, and freely transfers the specimen along a tool path around the laser beam to allow the laser cladding to be performed with the specimen fixed on an x and y-axes table.

In the laser-aided direct metal manufacturing and general laser cladding processes, there can be employed a transfer system in which a laser beam is transferred around a fixed specimen or a laser beam and a specimen are transferred at the same time, as well as the above-described transfer system 402. Additionally, in order to increase the degree of freedom of manufacturing, a three or more-axis transfer system or robot can be employed.

A gas control system 412 functions to control a variety of gases used in the laser cladding. Reference numerals 410 and 411 designate a cooling apparatus and an outdoor unit, respectively.

A control system 403 is comprised of a Personal Computer—Numeric Control (PC-NC) system and various input and output devices. The control system 403 controls and monitors in real time all apparatuses constituting the laser-aided direct metal manufacturing system of the present invention and including the laser generator 401, the transfer system 402, the cladding material feeder 404, the gas control system 412 and the cooling apparatus 410.

In particular, the control system 403 serves to perform a laser cladding operation on the basis of shaping information received from the CAD/CAM apparatus 409 and control in real time cladding process parameters to allow the height of a cladding layer to reach a target value on the basis of information on the height of a molten pool received from the image processing apparatus 408. Alternatively, the control system may be comprised of a general numeric control system in place of the PC-NC system.

Figure 5:
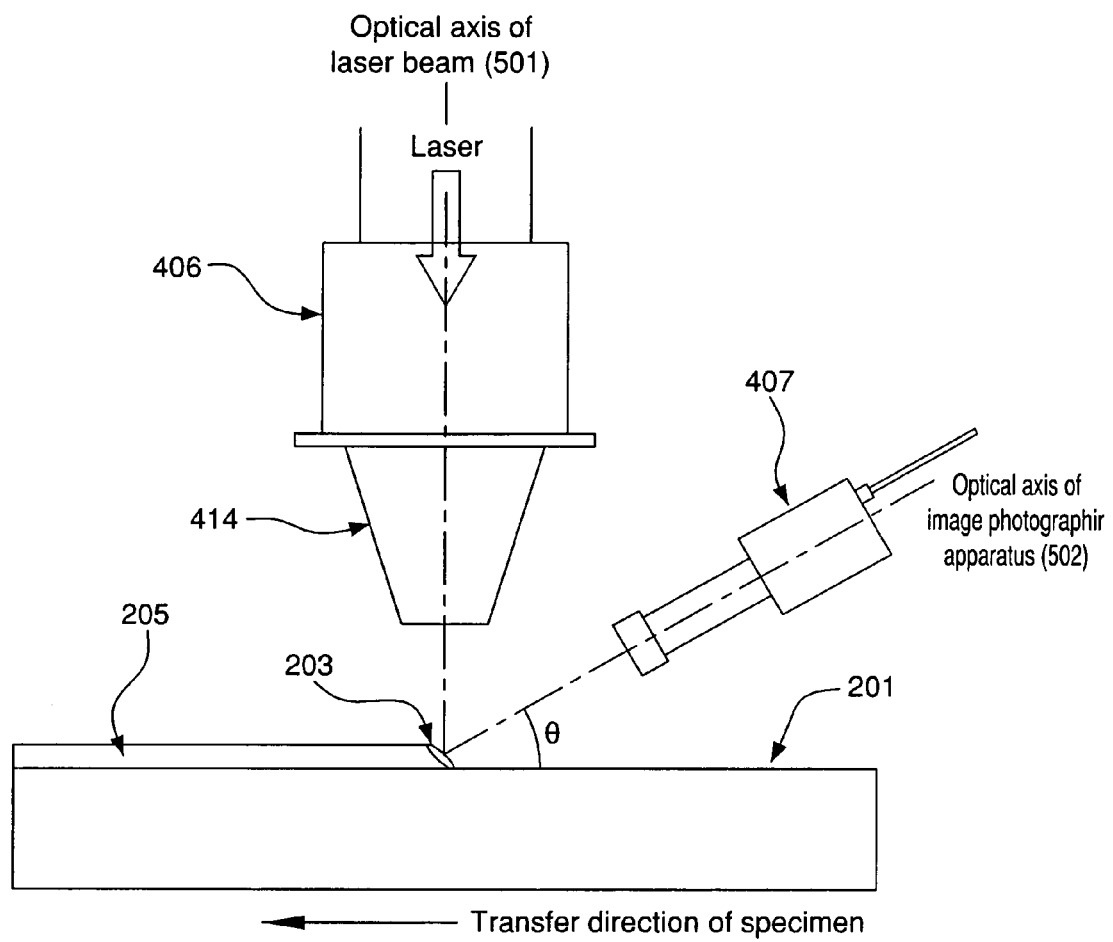
FIG. 5 is an enlarged view of a region of the system in which a concentric powder-feeding nozzle and an image photographing apparatus are arranged.

FIG. 5 is an enlarged view of a region of the system in which the concentric powder-feeding nozzle 414 and the image photographing apparatus 407 are arranged. In this drawing, a laser beam 202 and a powder stream 204 supplied to the molten pool 203 are not shown for ease of illustration.

Figure 1:
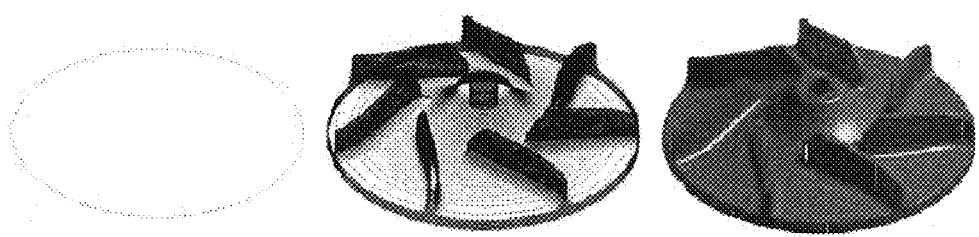
FIG. 1 is an illustration of Materials Incress Manufacturing (MM)
Figure 2:
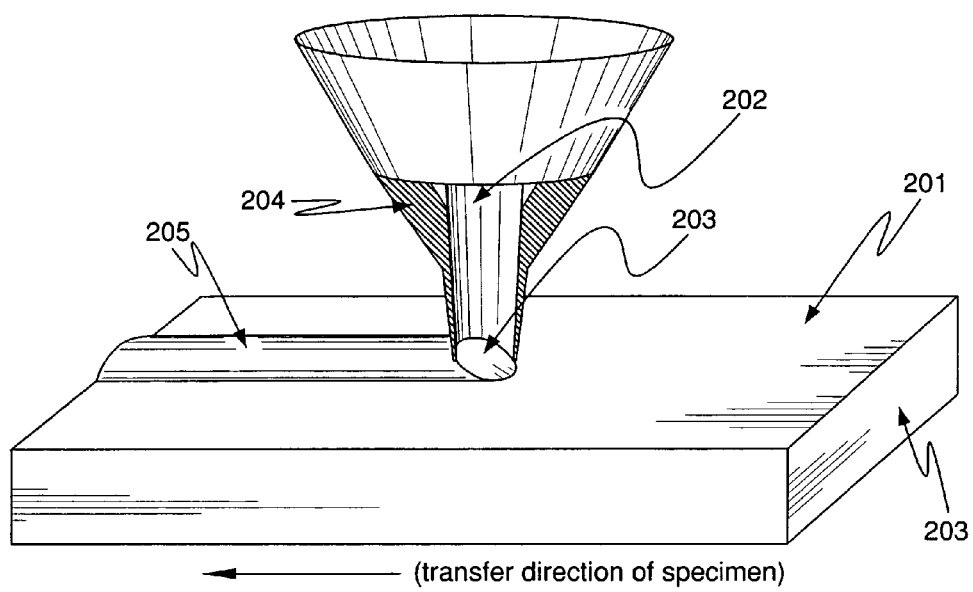
FIG. 2 is an illustration of laser cladding.
Figure 3:
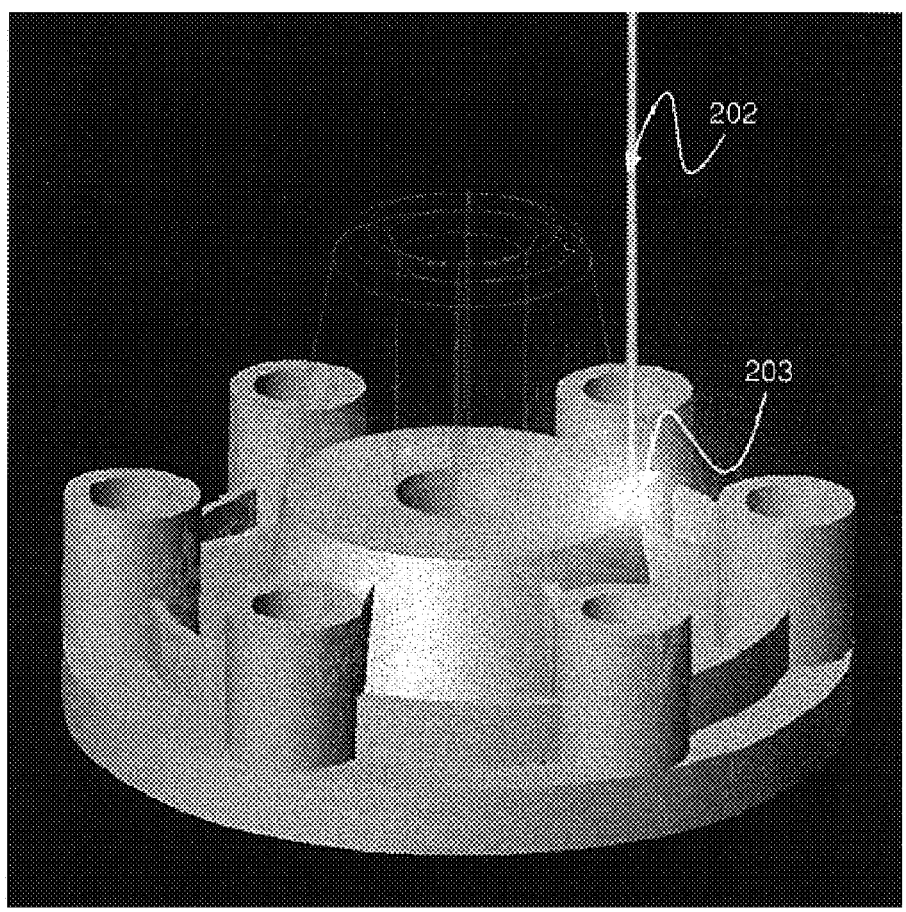
FIG. 3 is an illustration of laser-aided direct metal manufacturing.

As shown in FIG. 2, in a laser cladding process, the molten pool 203 is formed on the local area of a specimen to which the laser beam 202 is irradiated regardless of the transfer of the specimen 200 or laser beam. Accordingly, as shown in FIG. 5, the image photographing apparatus 407 is situated to form an angle of 90-θ° with the optical axis 501 of the laser beam and to allow the optical axis 502 of the image photographing apparatus 407 to pass through a region to which a laser beam is irradiated, so the image of the molten pool (for example, variations in height) can be photographed.

Figure 6:
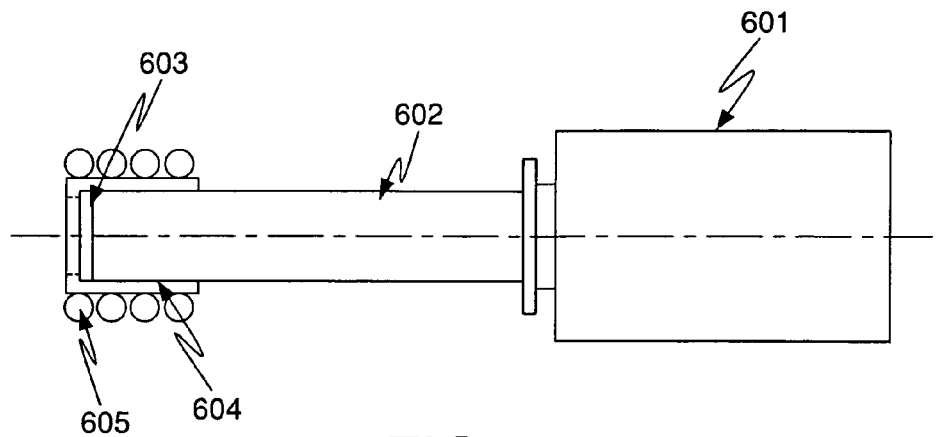
FIG. 6 is an enlarged view of the image photographing apparatus.

FIG. 6 is an enlarged view of the image photographing apparatus 407. The image photographing apparatus 407 includes a Neutral Density (ND) filter 603, a filter mounting fixture 604, a lens 602 and a Charge Coupled Device (CCD) camera 601.

The ND filter 603 functions to reduce the amount of light reflected by the molten pool 203 and incident upon the ND filter 603 and to protect the lens 602 from sputters generated in the laser cladding process. The ND filter 603 is mounted in front of the lens 602, that is, the filter mounting fixture 604. A cooling line 605, through which cooling water is supplied, is disposed around the circumferential surface of the filter mounting fixture 604 so as to prevent the ND filter 603 and the lens 602 from being damaged by radiant heat emitted from the molten pool 203.

The lens 602 functions to transmit the image of the molten pool 203 to the CCD camera 601. The lens 602 may be comprised of a general camera lens, but is preferably comprised of a telecentric lens of fixed magnification so as to minimize the distortion of the image of the molten pool 203.

In this embodiment, in order to obtain the image of the molten pool 203 in real time, there is employed a high-speed, black and white CCD camera that can obtain images of 50 frames/second in progressive scan mode. This CCD camera 601 obtains the image of the molten pool 203 every 20 msec and transmits image information to the image processing apparatus 408. In order to obtain the images of the molten pool 203 at a higher speed, a high-speed CCD camera of 150 frames/sec or more can be employed.

The image photographing apparatus 407 transmits image information of the molten pool 203 to the image processing apparatus 408 every 20 msec. And the image processing apparatus 408 calculates the physical position and height of the molten pool using an image processing technique, and transmits calculated data to the control system 403 in real time.

The image processing apparatus 408 is comprised of Frame Grabber, which is an image processing only board, and a personal computer. Software for the image processing (calculation of the height of a molten pool) is programmed using Visual C++ programming language.

The software requires 5 msec at its maximum to receive one piece of image information from the image photographing apparatus 407 and calculate the position and height of the molten pool. If the Frame Grabber equipped with a digital signal processor is employed, the processing speed of calculation can be considerably increased. Additionally, the software allows image signals received from the image photographing apparatus 407 to be displayed on a monitor in real time, so in the laser cladding operation, a user can observe a molten pool in real time.

The principle of calculating the position and height of a molten pool on the basis of the image of the molten pool using the image processing is described below.

Referring to FIGS. 2 and 5, in the laser cladding process, a cladding layer having a certain height is formed behind the molten pool 203 along a path through which the laser beam 202 is transferred. Additionally, the molten pool 203, which is formed by the irradiation of the laser beam 202, is inclined with respect to a specimen surface 201 at a certain angle. Meanwhile, the shape of the molten pool 203 can different according to the beam mode and sectional shape of the condensed laser beam 202. However, in the general laser cladding, the shape of the molten pool 203 can be assumed to be circular.

FIG. 7(A) is a view showing a molten pool observed in the optical axis of a laser beam. As depicted in FIG. 5, the image photographing apparatus 407 photographs the molten pool 203 while being inclined with respect to the specimen surface 201 at an angle of θ.

Figure 7:
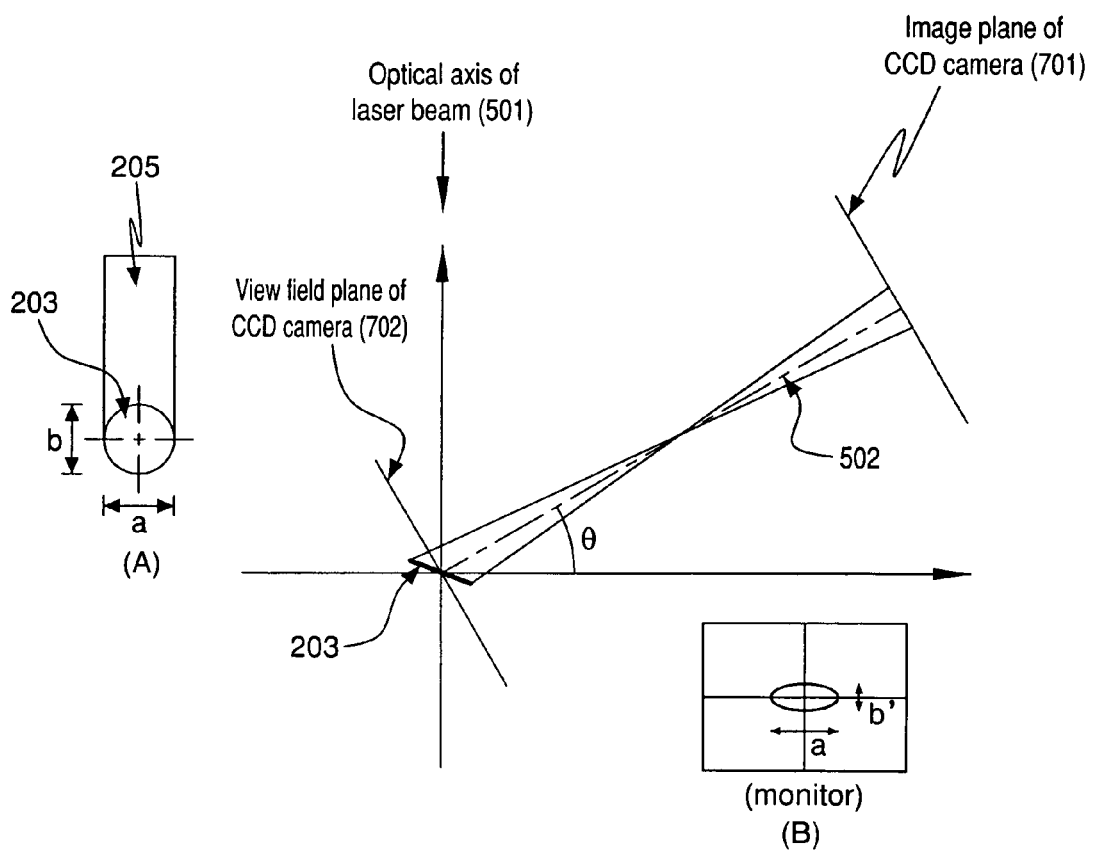

When the molten pool 203 is directed toward the image photographing apparatus 407, the image of the molten pool 203 is formed on an image plane 701 of a CCD camera as shown in FIG. 7, and the circular molten pool 203 is monitored as an ellipse whose axis b' parallel with cladding and transfer directions is rather short due to a difference in optical path.

Figure 8:
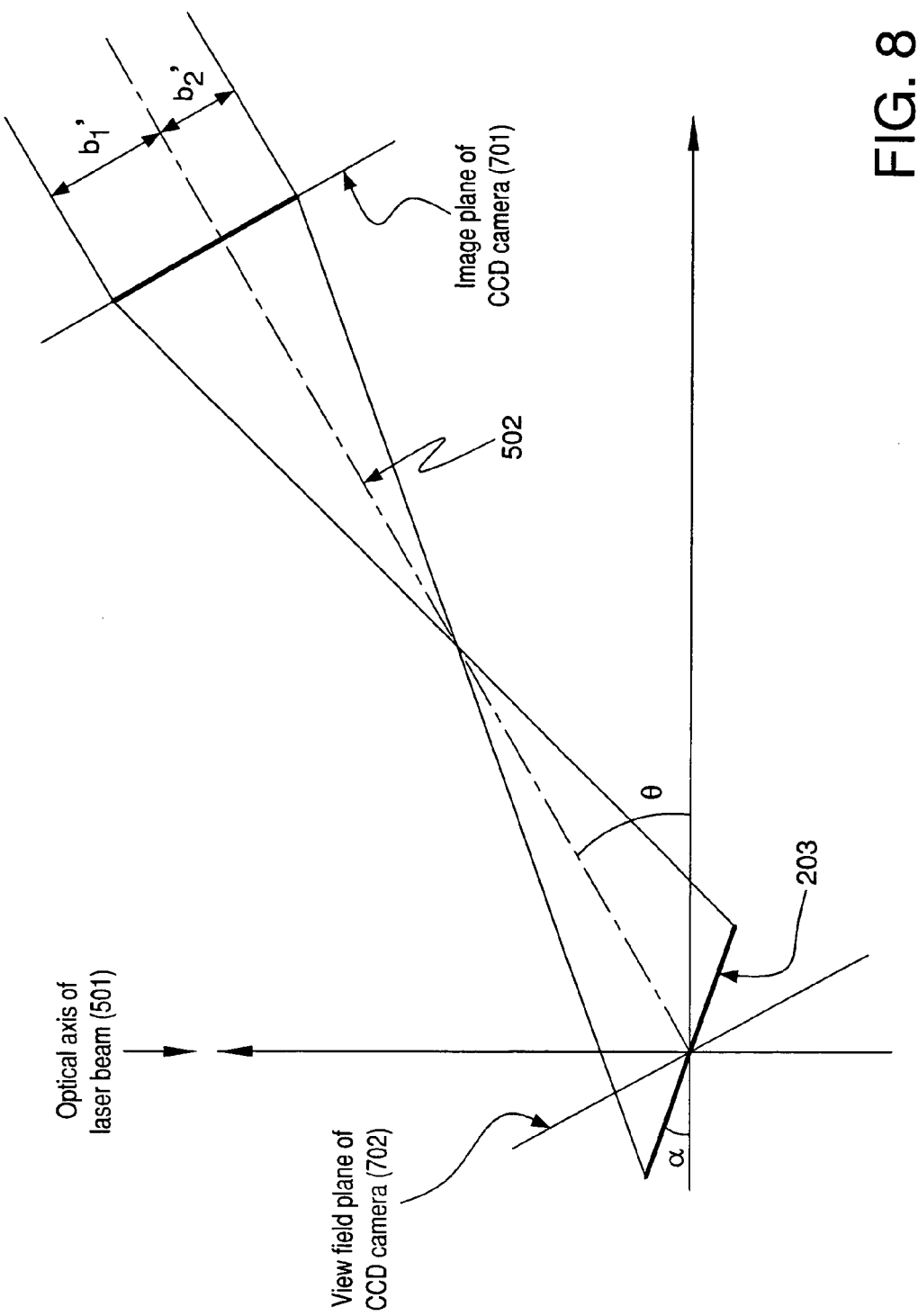
FIG. 8 is a schematic diagram showing a first principle by which an image of the molten pool is observed by the image photographing apparatus.

As illustrated in FIG. 8, the molten pool 203 is not situated on a view field plane 702 of a CCD camera, so the image of the molten pool formed on an image plane 701 of a CCD camera has somewhat different lengths $b_1$ and $b_2$ around the optical axis 502 of the image photographing apparatus 407. However, the difference is slight, so it is disregarded in the image processing process. When the size of the molten pool is assumed to be 1 mm, a difference ($b_1'$-$b_2'$) in length observed at the image photographing apparatus 407 is about 2 μm (2/1,000 mm), which is a relatively small value.

The image of the molten pool 203 is observed as different shapes according to the transfer direction of the specimen or laser beam.

FIGS. 9(A) to (D) are views showing variations in the shape of the molten pool. These variations are caused by the fact that the molten pool 203 is monitored by the image photographing apparatus 407 in a lateral direction and is directed toward the image photographing apparatus 407 according to the transfer direction of the specimen or laser beam. FIG. 9(A) is an image of the molten pool 203, which is observed when the molten pool 203 is directed toward the optical axis of the image photographing apparatus and observed as an ellipse vertically and relatively swollen. FIG. 9(B) is an image of the molten pool 203, which is observed when the molten pool 203 is oppositely directed toward the optical axis 502 of the image photographing apparatus 407 and monitored as an ellipse vertically and relatively flattened. FIGS. 9(C) and 9(D) are images of the molten pool 203, which are observed when the specimen or laser is transferred in a direction perpendicular to the optical axis 502 of the photographing apparatus 407 and monitored as an ellipse inclined to the right and left and vertically and relatively flattened.

The problem that the images of the molten pool 203 are observed to be different from another can be solved by installing one or more image photographing apparatuses in addition to the existing image photographing apparatus. In the measurement of the height of the molten pool 203, desirable results can be obtained using only a single image photographing apparatus.

The molten pool 203 is monitored as images each having a certain area through the image photographing apparatus 407 as shown in FIG. 9. In order to obtain the height of the molten pool on the basis of such image information using the image processing method, pixels representing the height of the molten pool have to be determined in the images.

In this invention, the centers of mass of images obtained through the photographing apparatus 407 are calculated, and the pixels, in particular, the row of the pixels, are determined as the height of the molten pool. In addition, there can be employed a variety of methods, in which a pixel corresponding to the longest row representing the image of the molten pool is determined as the height of the molten pool, or the center of an actual molten pool is obtained on the assumption that the molten pool takes a circular shape and a pixel corresponding to the center is determined in the image.

FIG. 10 is a schematic diagram showing how the images of the molten pool are monitored according to variations in the height of the molten pool. The images of the molten pool are observed at different positions on a monitor (or the image plane of the CCD camera) owing to variations in the height of the molten pool.

Accordingly, if the actual physical height of a certain pixel (absolute height) and the variation value of an actual height per pixel are known in the images of the molten pool, the actual physical height can be calculated on the basis of the image of the molten pool. In this invention, the above-described value is corrected using a standard specimen for which the height of a cladding layer is known. A correction module is included in software in charge of image processing.

The image processing apparatus 408 calculates the position and height of the molten pool using the above-described principle, and the calculated values are transmitted to the control system 403 in the form of ASCII data in real time. The control system 403 controls process parameters in real time so as to form a cladding layer having a shape and a thickness (height) corresponding to 2D sectional information on the basis of sectional shaping information received in real time from the CAD/CAM apparatus 409 and the height data of the molten pool received in real time from the image processing apparatus 408.

The process parameters affecting the height of the cladding layer includes laser power, the size and mode of a laser beam, the traverse speed of the specimen (or laser beam) (interaction time), a powder-feeding rate, etc. Of the above-described process parameters, the laser power affects the height of the cladding layer most.

Figure 11A:
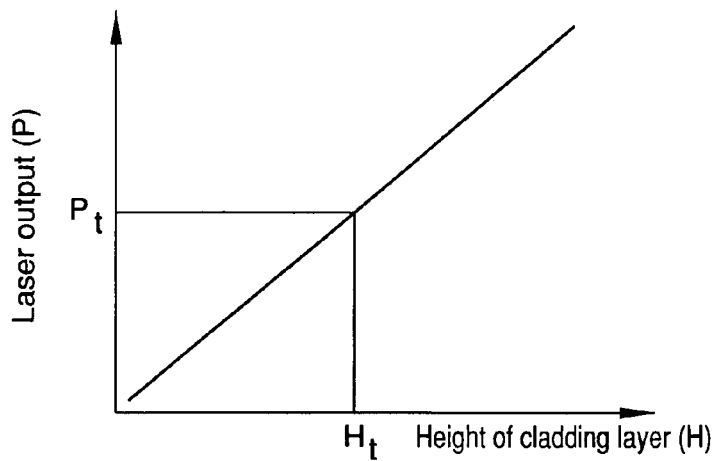
FIGS. 11(A) to (C) are graphs showing relations among a laser power, the height of a cladding layer and a laser power type.

The height H of the cladding layer has a proportional relationship with a laser power P, in which the height H increases linearly with the laser power P. When such a relationship is utilized, it is possible to freely adjust the height of the cladding layer through the real-time control of the laser power. In this case, the control of the laser power can be implemented through a variety of control methods, such as Proportion-Integral-Derivation (PID) control (see Modern Control Engineering, Katsuhiko Ogata, Prentice-Hall, 1990, pp. 592-605), fuzzy control (see Fuzzy Logic Control, Jeungnam Byeon, Hongreung Science Publishing Co., 1997), etc. However, in this embodiment, a relatively simple control method is employed, as shown in FIG. 11.

Figure 11B:
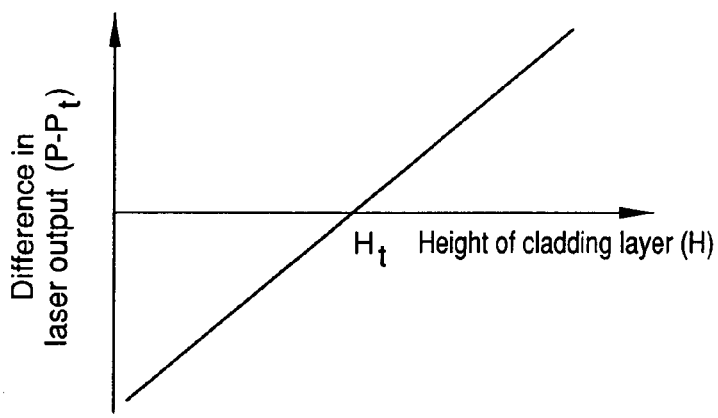

As shown FIG. 11(B), the above-described control method allows the height of the molten pool to reach the target value of the cladding layer, in such a way that a laser beam of an output greater than a normal laser output by P-$P_t$ is allowed to be irradiated on the specimen if the height H of the molten pool is less than the target value (target height) $H_t$ of the cladding layer, while a laser beam of an output less than a normal laser output by P-$P_t$ is allowed to be irradiated on the specimen if the height H of the molten pool is greater than the target value (target height) $H_t$ of the cladding layer.

Figure 11C:
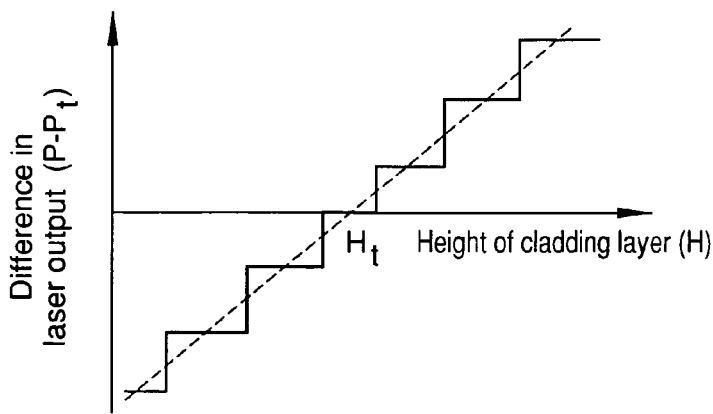

As shown in FIG. 11(C), in the actual laser power control, the laser power is controlled with the heights of the molten pool classified into groups each having a range. The control of the height of the cladding layer was successfully performed. Although in the present invention the laser power is controlled as one of the control parameters, it is possible to control other process parameters such as the powder-feeding rate and the traverse speed of the specimen (or laser beam) in a similar way in real time.

In general, as the powder-feeding rate is increased, the height of the laser cladding layer is increased. Accordingly, as in the laser power, it is possible to control the height of the cladding layer, in such a way that the powder-feeding rate is increased if the height of the molten pool is less than the target height of the cladding layer, while the powder-feeding rate is decreased or the feeding of powder is stopped if the height of the molten pool is greater than the target height of the cladding layer. The traverse speed of the specimen (or laser beam) is different from the laser power or the powder-feeding rate in that the height of the cladding layer is decreased according to an increase in the traverse speed of the specimen (or laser beam) while the height of the cladding layer is increased according to a decrease in the traverse speed of the specimen (or laser beam). Accordingly, the height of the cladding layer can be controlled to reach the target value of the cladding value, in such a way that the traverse speed of the specimen (or laser beam) is increased if the height of the molten pool is greater than the target value, while the traverse speed of the specimen (or laser beam) is decreased if the height of the molten pool is less than the target value.

Most lasers are controlled by an analog voltage signal between 0 to 10 V (or 12 V). For example, 0 V allows the laser power to be 0, while an analog voltage signal of 10 V allows the maximum power to be generated. Additionally, when an analog voltage signal between 0 to 10 V is applied, a laser power between 0 and the maximum power is generated. In most lasers, response time to an analog voltage signal is less than 1 msec. For the $CO_2$ laser generator 401 employed in the present invention, response time is about 60 μsec (60/1,000,000 sec). The control system 403 is designed to process an analog voltage signal to a 16 bit digital signal, which generates an effect in which an analog voltage signal is processed while being divided at 32,768 stages.

The control system 403 receives data on the height of the molten pool from the image processing apparatus 408 every 20 msec, compares the data with shaping information transmitted from the CAD/CAM apparatus 409, and determines a laser power value required to allow the height of the molten pool to reach a target value. The value determined as described-above is digital data so the value is converted into an analog signal through a D/A converter and inputted to the laser generator 401.

The laser generator 401 is designed to generate a laser power corresponding to an analog digital voltage signal inputted. However, although the same analog voltage signals is inputted to the laser generator, a laser power can be somewhat different according to the condition of a laser, such as laser gas, the degree of cooling, the degree of contamination of a laser resonator, the degree of vacuum, the states of various optical parts (such as a rear mirror and an output coupler), etc.

As a result, in the present invention, the laser power calibration method, which can achieve a desired laser power regardless of the state of the laser, is developed and applied. In this method, a closed loop is formed between the laser generator 401 and the control system 403, and an analog signal value is predetermined so that the control system 403 achieves a desired laser power just before a laser cladding or laser-aided direct metal manufacturing process using a PID control method.

In the process of the above calibration, the desired laser power is a target value. Additionally, the digital signal value, which allows a laser power value fed-back from the laser to reach the target value, is determined by varying a digital value at 32,768 stages corresponding to 0 to 10 V according to PID values.

When the number of laser power values used in the laser cladding or laser-aided direct metal manufacturing is ten, digital signals for achieving the laser outputs are determined in the above-described method.

The control system 403 controls the laser power using corrected analog signal values, so it is not affected by the state of the laser in the process of laser cladding or laser-aided direct metal manufacturing.

The following application examples relates to samples manufactured by the laser-aided direct metal manufacturing technology completed by the method and system of the present invention.

APPLICATION EXAMPLE 1

Figure 12:
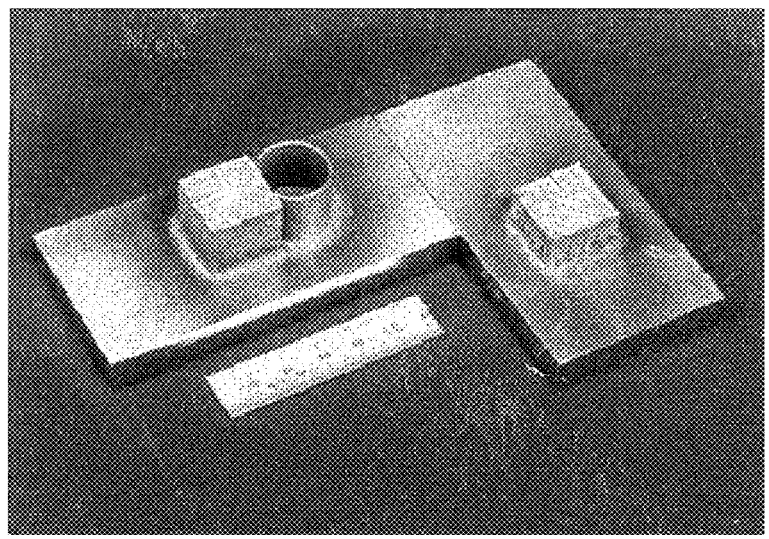
FIG. 12 is a photograph showing simple metal parts manufactured by the method and apparatus of the present invention.

FIG. 12 is a photograph showing simple metal parts manufactured by the method and apparatus of the present invention. A substrate having used in this manufacturing Was stainless steel (SUS 316), and a cladding material was a chromium-molybdenum hot-work die steel, H-13 tool steel (SKD 61), which is an alloy being commonly used as a material of die casting mold. A fine structure of 100% can be obtained by the method of the present invention, and the mechanical characteristics of the product were similar or superior to those of wrought materials.

APPLICATION EXAMPLE 2

Figure 13:
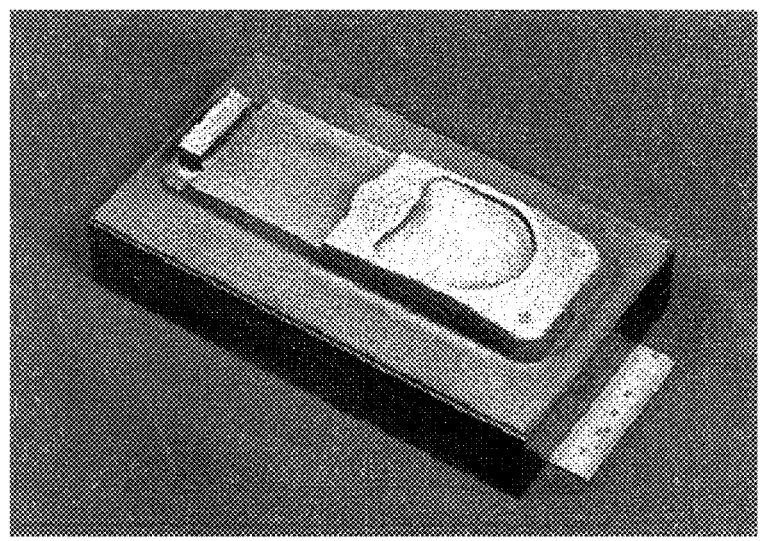
FIG. 13 is a photograph showing a mobile phone mold part manufactured by the method and apparatus of the present invention.

FIG. 13 is a photograph showing a mobile phone mold part manufactured by the method and apparatus of the present invention. In this application example 2, a thickness of 250 μm was sliced using 3D CAD data, which was used as shaping information. In this case, the size of a laser beam was about 0.8 mm, and the speed of laser cladding was 0.85 m/min. The substrate was made of stainless steel (SUS 316), and a cladding material was H-13 tool steel. The laser shaping time required for manufacturing the mold was 15 hours and 37 minutes.

APPLICATION EXAMPLE 3

Figure 14:
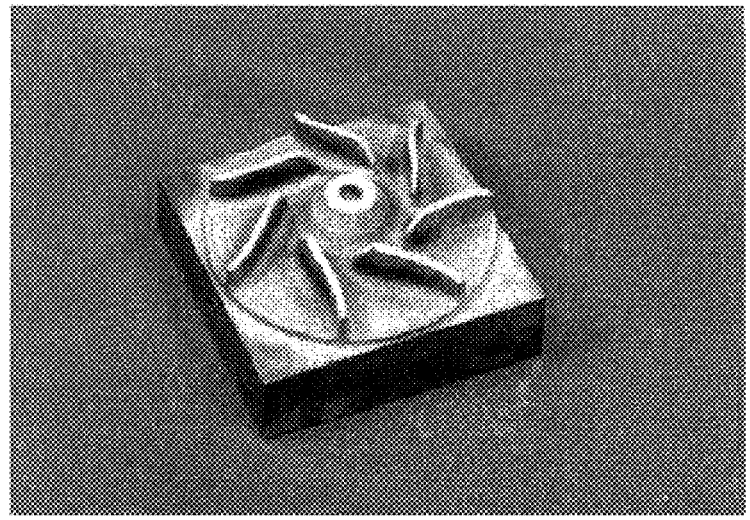
FIG. 14 is a photograph showing an impeller part manufactured by the laser-aided direct metal manufacturing technology of the present invention.

FIG. 14 is a photograph showing an impeller part manufactured by the laser-aided direct metal manufacturing technology of the present invention. The material of a substrate and a cladding was H-13 tool steel. The other conditions are the same as those of application 2. The laser shaping time required for manufacturing the mold was 12 hours and 8 minutes.

APPLICATION EXAMPLE 4

Figure 15:
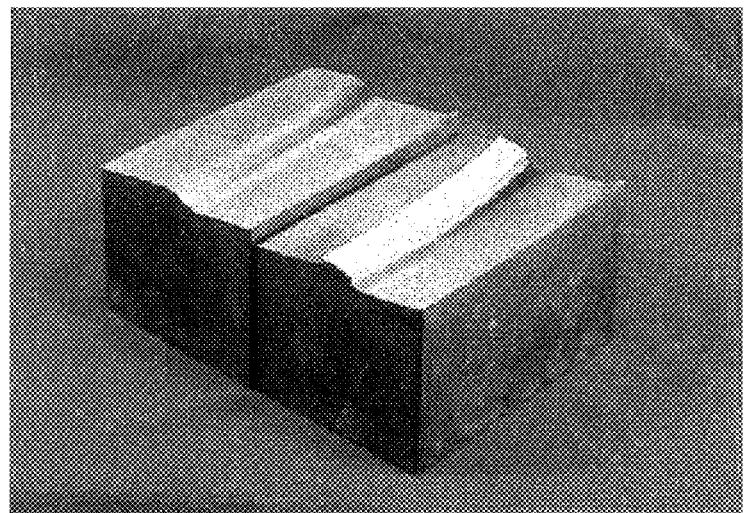
FIG. 15 is a photograph showing a partial part of automobile fender mold remodeled and manufactured by the method and apparatus of the present invention.

The principal characteristic of the laser-aided direct metal manufacturing is to directly manufacture a 3D shape using 3D CAD data. This characteristic allows a product having a 3D shape to be rapidly manufactured, and enables the restoration, remodeling and repairing of an existing product or mold by correcting CAD data or using reverse engineering. FIG. 15 is a photograph showing an automobile fender mold part that is partially cut away and remodeled through the correction of 3D CAD data The material of the mold was FCD 550, and a material used in the remodeling was H-13 tool steel (SKD 61). The laser shaping time required for manufacturing the mold was 1 hour and 43 minutes.

Industrial Applicability

As described above, the present invention provides a method and apparatus for laser cladding and laser-aided direct metal manufacturing, which is capable of measuring the position and height of a molten pool in real time using high-speed image photographing and image processing, and desirably controlling the height of a cladding layer by controlling process parameters. In particular, the laser-aided direct metal manufacturing is physically implemented.

Additionally, the laser-aided direct metal manufacturing of the present invention is a rapid manufacturing technology that can rapidly manufacture 3D products or a variety of tools for manufacturing such 3D products using functional materials required by the products or tools on the basis of 3D CAD data. This technology allows functional metal prototypes, trial and mass-production molds, finished products of complicate shape and various tools to be rapidly manufactured in comparison with conventional manufacturing technologies such as CNC cutting, casting, and other manufacturing machinery, etc. This technology is applicable to the restoration, remodeling and repairing of molds using reverse engineering.

Additionally the method and apparatus of the present invention can be applied to laser surface modification, such as laser surface alloying and laser cladding, and laser multilayer cladding in which a cladding layer of 2 mm or more is formed through repeated laser cladding, as well as laser-aided direct metal manufacturing. In these processes, the method and system of the present invention allow a cladding layer of a uniform thickness to be formed, so the precision of a laser operation is improved and the costs of post-processing can be reduced.

The method and apparatus for real-time monitoring and controlling the height of a cladding layer using image photographing and image processing in laser cladding and laser-aided direct metal manufacturing are not restricted to the above-described examples, but can be easily modified by those skilled in the art.

The invention claimed is:

1. A method for monitoring and controlling the height of a cladding layer in laser cladding and laser-aided direct metal manufacturing, comprising the steps of
   photographing a molten pool formed by the laser cladding as images each having a certain area;
   determining a pixel representing a height of the molten pool using the image of the molten pool obtained through the photographing to calculate an actual position and height of the molten pool in real time by using an actual physical height of a certain pixel and a variation value of the actual height per pixel corrected by using a standard specimen for which the height of a cladding layer is known; and
   controlling a process parameter affecting the height of the cladding layer in real time to control the height of the cladding layer to reach a target height value by increasing a thickness of the cladding layer if the actual height of the molten pool is less than the target height value and by decreasing the thickness of the cladding layer whenever the actual height of the molten pool is greater than the target height value to form a cladding layer having a shape and a thickness corresponding to 2D sectional information derived from, stored sectional shaping information; and thereby correcting overshooting of the actual height at all heights above the target height.

2. The method according to claim 1, wherein the process parameter is one of a laser power and a size and a mode of a laser beam.

3. The method according to claim 1, wherein the process parameters are the cladding material—feeding rate and a traverse spaced of a specimen or laser beam.

4. The method according to claim 1, wherein the pixel representing the height of the molten pool is determined by one of methods in which pixels corresponding to the longest row representing the image of the molten pool are selected as the height of the molten pool, or the center of an actual molten pool is obtained on the basis of a circular or an ellipse shape of the molten pool and pixels corresponding to the center are determined in the images.

5. The method according to claim 1, wherein the pixel representing the height of the molten pool is the mass center of the image of the molten pool.

6. The method according to claim 2, further comprising the step of;

correcting a laser input analog voltage signal to control the laser power regardless of a state of the laser generator in laser cladding and laser-sided direct metal manufacturing.

7. A method for monitoring and controlling a height of a cladding layer in laser cladding and laser-aided direct metal manufacturing, comprising:

photographing a molten pool Conned by the laser cladding as images each having a certain area; and determining a pixel representing height of the molten pool using the image of the molten pool obtained through the photographing to calculate an actual position and height H of a molten pool in real time by using an actual physicals height of a certain pixel and a variation value of the actual height per pixel corrected by using a standard specimen for which the height of a cladding layer is known; and controlling a laser power in real time to control the height of the cladding layer to reach a target height value $H_t$ by irradiating a laser beam of an output greater than a normal laser output by $P-P_t$ on the specimen if the actual height H of the molten pool is less than the target value $H_t$ of the cladding layer and by irradiating a laser beam of an output less than a normal laser output by $P-P_t$ on the specimen whenever the actual height H of the molten pool is greater than the target value $H_t$ of the cladding layer; and thereby correcting overshooting of the actual height at all heights above the target height.

8. The method according to claim 7, wherein the laser power is controlled using one of Proportional-Integral-Derivative (PID) and fuzzy control methods to allow the height of the molten pool to reach a target value of the cladding layer.

9. The method according to any of claims 1 and 8, wherein the method is used for restoration, remodeling and repairing of a metallic product or mold.

* * * * *